Oct. 2, 1962 — C. H. AUGER — 3,056,578
ROTOR ASSEMBLY
Filed Feb. 23, 1961 — 2 Sheets-Sheet 1
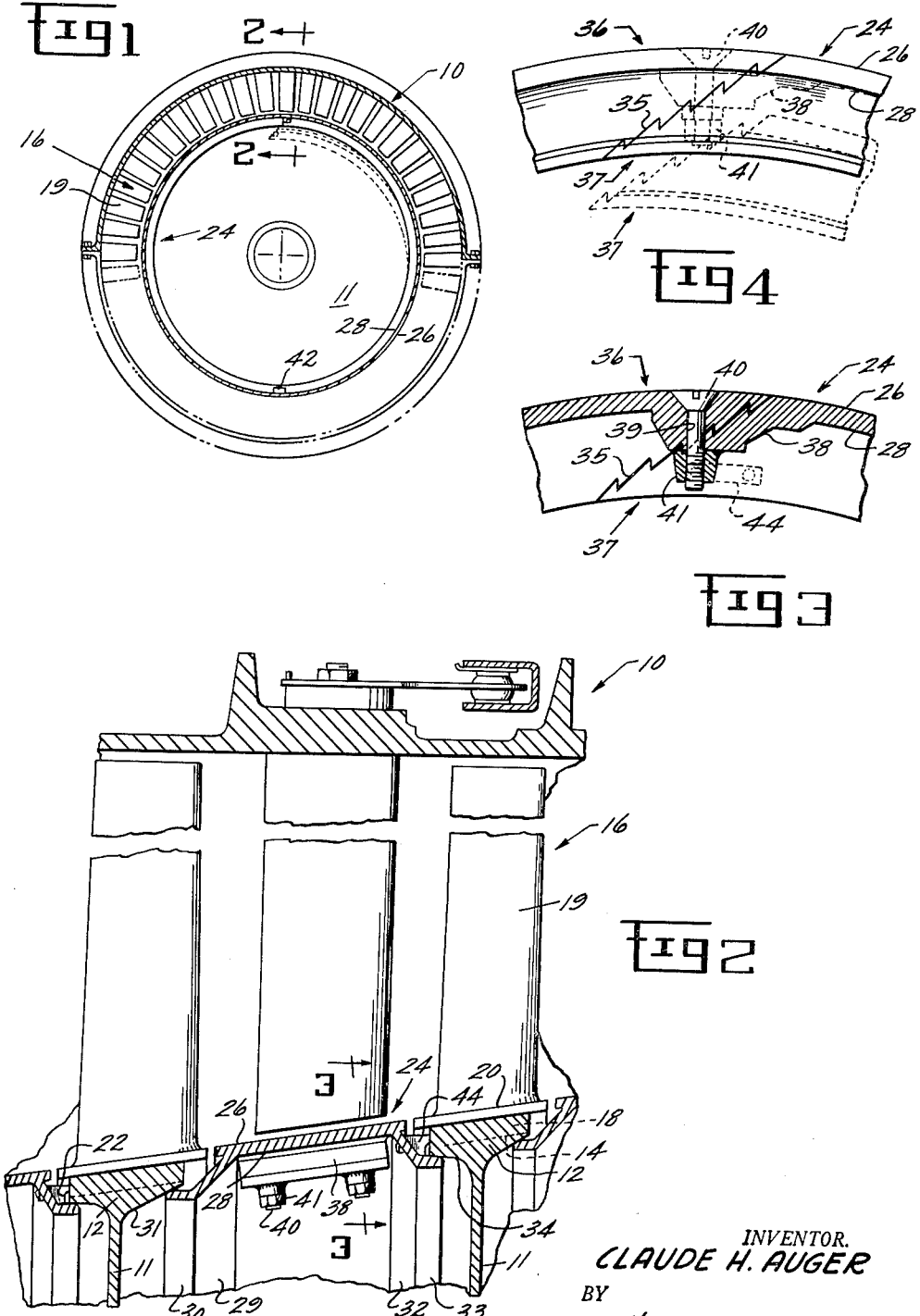
INVENTOR.
CLAUDE H. AUGER
BY
Harry C. Burgess
ATTORNEY

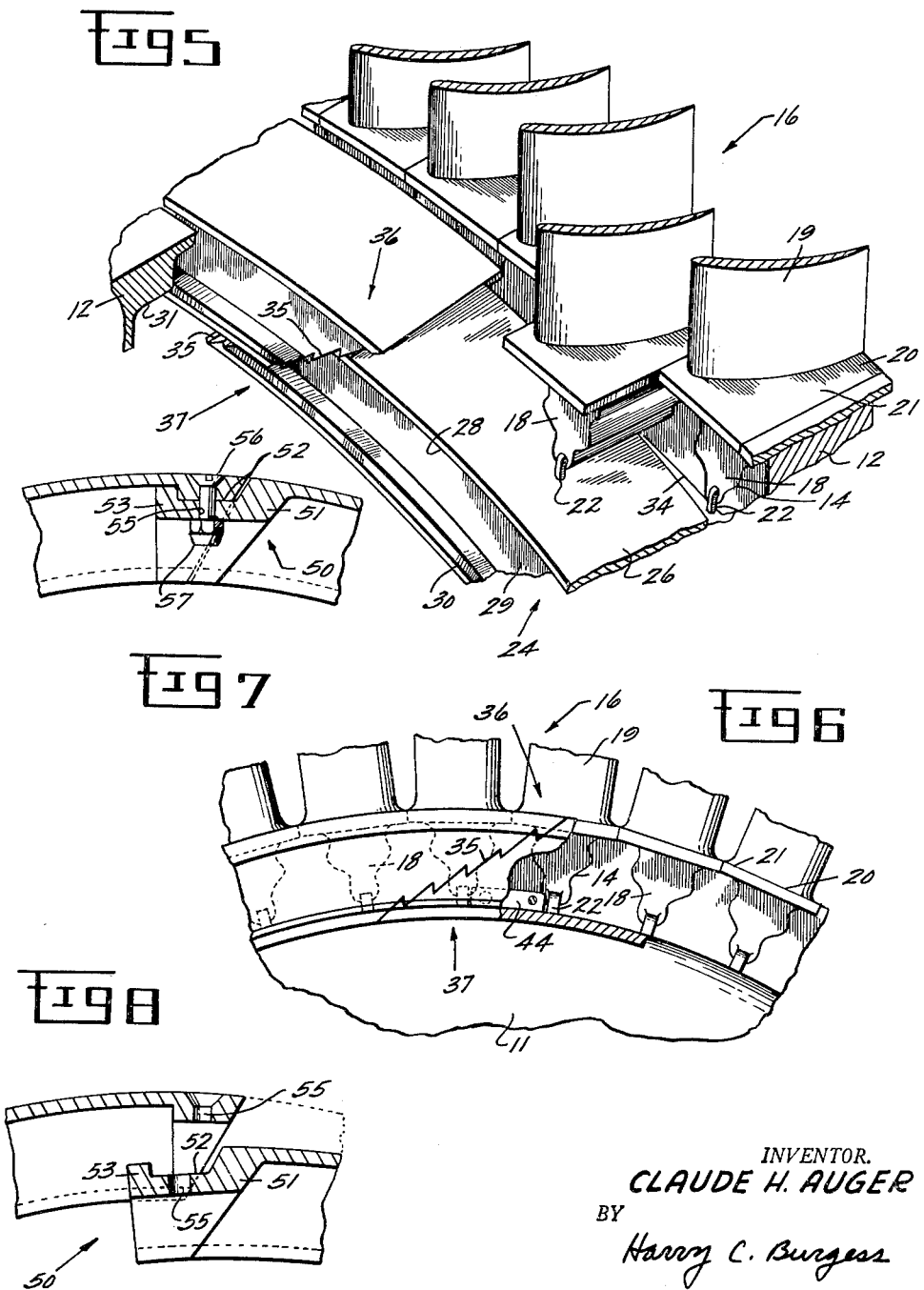

3,056,578
Patented Oct. 2, 1962

3,056,578
ROTOR ASSEMBLY
Claude H. Auger, Cincinnati, Ohio, assignor to General Electric Company, a corporation of New York
Filed Feb. 23, 1961, Ser. No. 91,142
5 Claims. (Cl. 253—39)

The present invention relates to a turbomachine and, in particular, to a turbomachine rotor having blades which are individually removable without necessity for disassembly of the entire rotor or disturbance of adjacent blades.

It is well known practice in the design of fluid flow machines, such as turbojet engines, to design the rotors with relatively stiff, drum-like structures. This usually has included affixing the turbomachine blading to the rotary wheel disk member rims in such a way as to make the blades difficult to remove or replace. Where rotor blades have been individually removable when worn or damaged without the necessity for discarding the entire wheel disk, it usually has required a major disassembly of the entire rotor up to and including the stage in which the worn or damaged blade is located. Also, previous attempts at providing individually removable blades have often resulted in relatively complex and expensive build-ups in the general area of the rim of the rotary disk members. Frequently such innovations have been accompanied by increases in weight which would be prohibitive in a turbomachine designed for aircraft application. Finally, the known attempts to solve the problem of individually and easily removable blades have sometimes required the development of special types of blading and/or complex methods of maintaining wheel balance.

It is therefore an object of this invention to provide a turbomachine having rotor blades which are individually removable and replaceable without disassembly of the entire rotor.

It is a further object of this invention to provide a turbomachine wherein worn or damaged rotor blades are individually replaceable without necessity for disassembly of the rotor and without disturbance of adjacent blades.

It is still another object of this invention to provide an improved turbomachine rotor wherein individual damaged or worn rotor blades can be removed without necessity for disassembly of the rotor or disturbance of adjacent unaffected blades or rebalancing of the blade carrying wheel member itself, which rotor is of a simple, uncomplicated and inexpensive construction.

Briefly stated, in accordance with one aspect of my invention, I provide a collapsible spacer ring for use between the rim portions of adjacent rotary wheel disks of a turbomachine rotor, the ring being adapted to permit individual removal of rotor blades. This arrangement also allows rotor wheel balance to be unaffected when rotor blades of same moment weight as removed blades are used as replacements.

Other objects and advantages of my invention, as covered in the appended claims, will become more apparent from the following description taken in connection with the accompanying drawings in which:

FIGURE 1 is an axially-directed, end view of a turbomachine compressor featuring an embodiment of my invention;

FIGURE 2 is a fragmentary view, partially in section, taken along line 2—2 of FIGURE 1 and illustrating the preferred form of my invention in greater detail;

FIGURE 3 is a fragmentary sectional view taken along line 3—3 of FIGURE 2 and illustrating an embodiment of a positive locking means for use with the collapsible spacer ring;

FIGURE 4 is a fragmentary view showing the preferred form of the spacer ring and locking means with the ends of the ring (in phantom) in displacement;

FIGURE 5 is a perspective presentation of a section of a turbomachine compressor rim area illustrating the manner in which the preferred form of my invention permits removal of an individual blade;

FIGURE 6 is a fragmentary view, partially cutaway, showing means for preventing rotation of the spacer ring;

FIGURE 7 is a fragmentary sectional view of another embodiment of a positive locking means for the spacer ring showing the ends of the ring in engagement; and FIGURE 8 is a fragmentary sectional view showing the space ring embodiment of FIGURE 7 with the ends of the ring displaced to allow removal of the blades.

Referring now more particularly to FIGURES 1 and 2 of the drawings, numeral 10 indicates a turbomachine compressor stator or casing which surrounds a plurality of rotary wheel disk members 11 rigidly connected to each other. Each disk member has an enlarged peripheral rim portion 12. As is best shown in FIGURE 5, the enlarged rim portions are axially cut by a series of slots 14. These slots are adapted to receive a plurality of blade members indicated generally at 16. Each blade member contains a root portion 18, which is received in a rim slot, an airfoil portion 19, and a platform portion 20. The upper surface 21 of each platform portion helps to form the primary flow path for the fluid passing through the turbomachine. Each of the blade root portions is provided with means to prevent movement of the blade in one direction, when the blade is positioned in the slot, which in the embodiment shown comprises a tab or tang member 22.

Indicated generally at 24 is the collapsible spacer ring which is the heart of the invention. The spacer ring is adapted to fit between the rims of a pair of adjacent rotary wheel disks 11. The ring includes an upper surface or platform 26 which, in cooperation with the blade platform 21, forms the turbomachine fluid flow path. Disposed on the lower surface 28 of each spacer ring, adjacent the edges thereof, are a pair of extensions or supporting members. The forwardmost supporting member or extension 29 contains a cylindrical rim portion 30 adapted to contact the beveled underside 31 of the forwardmost rotary disk member 11, as shown in FIGURE 2. In a similar manner, the rearwardmost supporting member or extension 32, which contains a cylindrical rim portion 33, is adapted to contact the beveled underside 34 of the aft rotary disk member 11. It will thus be apparent that the spacer ring 24 is prevented from moving axially of the rotor by reason of the cylindrical rim portions 30 and 33 of the ring being in abutment with the beveled undersides of the enlarged rim portions of the disks.

Referring particularly to FIGURE 3, it will be seen that the spacer ring 24 is split by means of a stepped or zig-zag cut 35. This design of the cut is adapted to accomplish self-locking of the end portions of the ring, indicated generally at 36 and 37, since, normally, the end portions are in alignment—circumferentially—and thus the vertical portions of the cut prevent relative movement apart of the ends. If desired, as a safety feature, for example, a more positive locking means for the ring may be provided. In the embodiment in FIGURE 3 this comprises an enlarged portion or rib 38 on the underside of the spacer ring which is intersected by the spacer split line. Extending through both portions of the rib or enlarged portion of the ring is a smooth hole 39 adapted to receive a bolt 40. To securely fasten together the end portions of the ring during operation of the turbomachine, the two portions of the zig-zag cut are mated and bolt 40 is dropped through hole 39 where it is engaged with a captive nut 41 welded, or otherwise permanently attached, to the ring. With use of a cut, such as is shown in FIGURE 3, however, it may not be necessary to use the nut and bolt since centrifugal force will tend to force the stepped ends of the ring together during operation of the rotor. If a positive locking means is utilized, in addition to the cut configuration, a counterbalancing weight 42 is provided at a point 180° from the enlarged rib portion 38, as is shown in FIGURE 1.

FIGURE 5 indicates the manner in which my novel spacer ring arrangement permits individual removal of damaged rotor blades. In the pictorial illustration, the spacer ring locking bolt (if used) has been removed and the innermost extending end portion 37 of the split ring collapsed or depressed inwardly towards the center of the turbomachine. As will be obvious from the drawings, the nature of the zig-zag cut 35 is such that the edges will separate easily, i.e., the inner, or underlying ring end portion 37 will move inwardly of the machine. The blade to be removed may then be slid forwardly at which time it will pass over the depressed upper surface 26 of the spacer ring. When clear of the slot 14, the blade may then be lifted directly radially outward of the machine. The process is merely reversed to insert a new blade. The deflection of the ring is possible due to its size and natural resiliency, i.e., the ring is constructed of steel or a like material.

It is thus apparent that removal of one blade does not require complete or partial disassembly of the rotor nor does it disturb adjacent blades. Furthermore, the balance of the rotor assembly need not be upset since the split spacer ring 24, when depressed, can be rotated around to allow a blade of matching weight to be inserted directly opposite (i.e., 180° from) the new blade which replaces the one removed, or a blade of equal moment weight may replace the one removed.

As best shown in FIGURE 6, a locking lug 44 is affixed to the innermost underlying end portion 37 of the split ring, i.e., the end portion adapted to be depressed inwardly. This locking lug is adapted to fit between two of the tangs or tabs 22 on the rotor blade base portions. The purpose of the lug is to insure against free rotation of the spacer ring during operation of the turbomachine. However, the locking tab may not be necessary as centrifugal force and/or thermal expansion will usually be sufficient to cause the cylindrical extensions 30 and 33 of the ring to press against the beveled undersides of the rotary disk member rims in such a manner as to prevent rotation.

FIGURES 7 and 8 illustrate a further embodiment of means for positively locking the end portions of the collapsible, split spacer ring during rotation of the turbomachine should it prove to be necessary. The locking means indicated generally at 50 consists of an enlarged portion 51 on the end portion to be depressed. The enlarged portion is undercut at 52 to form an outwardly-directed lip 53. Another enlarged portion or rib 54 is provided on the end portion of the ring which is not moved relatively to the disk member rim to effectuate blade removal. This latter portion is adapted to fit into the cut 52 on the other end portion and into engagement with the lip. A smooth hole 55 adapted to receive a bolt 56 is provided in the two aligned end portions. The end portions of this embodiment of the ring are then securely engaged by means of a captive nut 57 adapted to be engaged with the bolt and tightened down in the manner of the previous embodiment.

In describing the invention it is not my intention to be limited to the exact means shown, but rather it is my intention to cover all changes and modifications to the example of the invention shown as are within the scope of the following claims.

I claim:

1. In an axial-flow turbomachine including a plurality of rotary disk members having rows of blades mounted on the peripheries thereof, means adapted to engage a pair of disk members adjacent their peripheries, said means comprising a spacer ring, the ring being split at a single location of its circumference, the split having a configuration such that the resultant end portions of the ring adjacent the split line are self-locking, one of said end portions underlying the other, said one of said end portions being separable from said other end portion by pressure exerted adjacent the underlying end portion in a radially inward direction, one or more of said blades being demountable, when said end portions are separated, by movement directly axially to a position overlying the spacer ring and then directly radially outwardly of the turbomachine.

2. In a multistage axial-flow turbomachine including a plurality of rotary disk members having rows of blades mounted on the peripheries thereof, means adapted to engage a pair of said disk members adjacent their peripheries, said means comprising a spacer ring, the ring having outer and inner surfaces and being cut through at one point in its circumference, said cut having a zig-zag configuration, the general line of direction of the cut being at less than a right-angle to said outer surface, the resultant end portions of the split spacer ring abutting each other in an overlying relationship and being self-locking by virtue of said zig-zag configuration, said end portions being separable by pressure exerted on the underlying end portion in a radially inwardly direction, at least one of said blades being demountable, when said end portions are separated, by movement directly axially to a position overlying the spacer ring and then directly radially outwardly of the turbomachine.

3. A multistage axial-flow turbomachine, including a plurality of rotary wheel disk members having rim portions, a series of axial slots in said rim portions, a plurality of rotor blades, said blades having root portions positioned in said slots, projecting means on said root portions adapted to engage said rim portions to prevent axial movement of said blades in one direction, said blades including platform portions overhanging said rim portions, and a collapsible spacer ring adapted to fit between the rows of overhanging blade platforms, said ring including an outer portion having an outer surface and an inner surface, the outer surface forming a flow path with said blade platforms, and a pair of circumferentially-extending, disk-engaging portions disposed on the inner surface at either edge thereof, said disk-engaging portions extending generally radially inwardly of the turbomachine and contacting the disk members on the undersides of the rim portions thereof, said spacer ring being split at a single location of its circumference, the resultant end portions on either side of the split line being separable, relatively, in a manner such that one portion is movable sufficiently inwardly of the turbomachine to permit removal of a rotor blade by movement of the blade opposite to said one direction, the blade root portion passing over the spacer ring outer surface, positive locking means to insure that the ends of the collapsible spacer ring do not separate during operation of said turbomachine, and lug means engageable with said projecting means to prevent rotation of said ring about the turbomachine axis.

4. A multistage axial-flow turbomachine, including a plurality of rotary wheel disk members having rim portions, a series of axial slots in said rim portions, a plurality of rotor blades, said blades having root portions positioned in said slots, projecting means on said root portions adapted to engage said rim portions to prevent axial movement of said blades in one direction, and a collapsible spacer ring adapted to fit between a pair of rim portions, said ring including an outer portion having an outer surface and an inner surface and a pair of circumferentially-extending, disk-engaging portions disposed on the inner surface at either edge thereof, said disk-engaging portions extending generally radially inwardly of the turbomachine and contacting the disk members on the undersides of the rim portions thereof, said spacer ring being cut through at one point in its circumference, said cut having a zig-zag configuration, the general line of direction of the cut being at less than a right-angle to said outer surface, the resultant end portions of the spacer ring abutting each other in an overlying relationship, said end portions being self-locking by virtue of said zig-zag configuration and being separable, relatively, in a manner such that one portion is movable sufficiently inwardly of the turbomachine to permit removal of at least one rotor blade by movement of the blade opposite to said one direction, the blade root portion passing over the spacer ring outer surface.

5. An axial-flow turbomachine, including a pair of rotary disk members having rim portions, a series of axial slots in said rim portions, a plurality of rotor blades, said blades having root portions positioned in said slots, projecting means on said root portions adapted to engage said rim portions to prevent axial movement of said blades in one direction, and a collapsible spacer ring adapted to fit between said rim portions, said ring including an outer portion having an outer surface and an inner surface and a pair of circumferentially-extending, disk-engaging portions disposed on the inner surface at either edge thereof, said spacer ring being cut through at one point in its circumference, said cut having a zig-zag configuration, the general line of direction of the cut being at less than a right-angle to said outer surface, the resultant end portions of the spacer ring abutting each other in an overlying relationship, said end portions being separable, relatively, in a manner such that one portion is movable sufficiently inwardly of the turbomachine to permit removal of one or more rotor blades by movement of the blades opposite to said one direction, the blade root portions passing over the spacer ring outer surface, locking means to positively insure that the ends of the collapsible spacer ring do not separate during operation of said turbomachine, and lug means engageable with said projecting means to prevent rotation of said ring about the turbomachine axis.

References Cited in the file of this patent

UNITED STATES PATENTS

| 2,497,151 | Clark | Feb. 14, 1950 |
| 2,806,719 | Ohlstrom | Sept. 17, 1957 |

FOREIGN PATENTS

| 341,486 | France | June 11, 1904 |
| 812,337 | Germany | Aug. 27, 1951 |